United States Patent
Thanawala

[11] 3,881,137
[45] Apr. 29, 1975

[54] FREQUENCY SELECTIVE DAMPING CIRCUITS

[75] Inventor: Hemesh Laxmidas Thanawala, Stafford, England

[73] Assignee: Associated Electrical Industries Limited, London, England

[22] Filed: Jan. 16, 1974

[21] Appl. No.: 433,865

[30] Foreign Application Priority Data
Jan. 17, 1973 United Kingdom............... 2423/73

[52] U.S. Cl. ............... 317/53; 307/105; 317/20; 323/124; 333/76
[51] Int. Cl. ............... H02h 1/04
[58] Field of Search .......... 323/121, 122, 124, 125, 323/128; 333/76; 317/14 R, 14 D, 20, 53, 138, 157; 321/9 R; 307/105

[56] References Cited
UNITED STATES PATENTS
| | | | |
|---|---|---|---|
| 1,568,141 | 1/1926 | El Sasser | 333/70 R |
| 3,290,578 | 12/1966 | Ainsworth | 333/76 |
| 3,555,291 | 1/1971 | Dewey | 333/76 |

*Primary Examiner*—William H. Beha
*Attorney, Agent, or Firm*—Kirschstein, Kirschstein, Ottinger & Frank

[57] ABSTRACT

In A.C. power systems, large capacitors used in conjunction with synchronous or induction machines, or with saturable reactors, are prone to self-excited oscillation at harmonic or sub-harmonic frequencies. Damping circuits are known in which supply-frequency capacitor current is kept away from a damping resistance path by a series or shunt resonant circuit. The invention provides improved damping of harmonic or sub-harmonic oscillations by adding capacitance or inductance, or both, to achieve a resonance at the parasitic frequency and so force the parasitic current through the damping resistance.

21 Claims, 15 Drawing Figures

FREQUENCY SELECTIVE DAMPING CIRCUITS

This invention relates to frequency selective damping circuits for use in A.C. power systems.

It is commonly necessary in A.C. power systems to use large capacitors to balance inductive currents drawn by real loads or by inductive compensating devices. Synchronous and induction machines, and iron-cored transformers and saturable reactors are examples of such inductive loads. The compensating capacitors may be used in series or in shunt with the load.

In A.C. power supply systems capacitors are used to cancel the effect of inductive loads where, for example, the inductive load is itself a compensating device.

However, such capacitors are sometimes subject to self-excited parasitic resonances at sub-harmonic or harmonic oscillation frequencies. In order to suppress currents of such abnormal frequencies it is sometimes necessary to provide additional damping resistance in the capacitive part of the circuit. Unless precautions are taken, however, normal supply frequency currents will also be subject to the added damping resistance and power loss will occur. To avoid this latter loss it has been proposed to use a frequency selective damping filter which may take two basic forms. In one, the damping resistance is connected in parallel with the capacitor and a parallel resonant circuit, resonant at the supply frequency, is connected in series with the resistance thus biasing the supply frequency current toward the capacitor branch and away from the resistance. In the other form proposed, the capacitor is connected in series with a series resonant circuit resonant at the supply frequency. The resistance is then connected in parallel with the series resonant circuit so that the supply frequency current again by-passes the resistance.

It is an object of the present invention to provide an improved damping circuit suitable for the suppression of the above parasitic oscillations.

According to one aspect of the present invention, in a frequency selective damping circuit comprising two parallel paths one of which includes resistance and one of which includes a resonant circuit connected to bias current of the resonant frequency toward that one of the parallel paths not including said resistance, the circuit further comprises reactive circuit means which, in combination with said resonant circuit provides a further resonant circuit at the resonant frequency of which, current is biased toward said path including resistance, the arrangement being such that current of the operational frequency is relatively undamped and current of a predetermined other frequency is selectively damped.

The reactive circuit means may comprise reactances of opposite kinds such as to provide damping resonances at frequencies above and below the operational frequency.

In an application of the invention to the suppression of parasitic resonances associated with a voltage compensating supply-frequency capacitor, the capacitor is connected in the damping circuit so as to provide a relatively undamped path for the capacitor current of the supply frequency and a damped path for parasitic currents of predetermined other frequency.

The first resonant circuit may be a shunt circuit, one of said parallel paths then comprising the shunt circuit in series with said resistance and the other parallel path comprising said capacitor. Alternatively, the first resonant circuit may be a series resonant circuit, one of said parallel paths then comprising said resistance and the other parallel path comprising said series resonant circuit, said capacitor being connected in series with each path.

According to another aspect of the invention, in a voltage compensating circuit for an A.C. power system, including a capacitor operable at the supply frequency and subject to parasitic oscillations of other than the supply frequency, the capacitor is connected in a damping circuit as aforesaid.

In the application of such a voltage compensating circuit to an electricity supply system, including a saturable core reactor and a capacitor connected in series, the capacitor is connected in a damping circuit as aforesaid. The reactor may then be tapped at a point such that the part of the reactor between the tapping point and the capacitor, and the capacitor itself, together provide a series resonant circuit resonant at the supply frequency, said first resonant circuit then being constituted by said part of the reactor and the capacitor connected thereto.

A number of different frequency selective damping circuits will now be described, by way of example, with reference to the accompanying drawings, of which:

Figure 1:
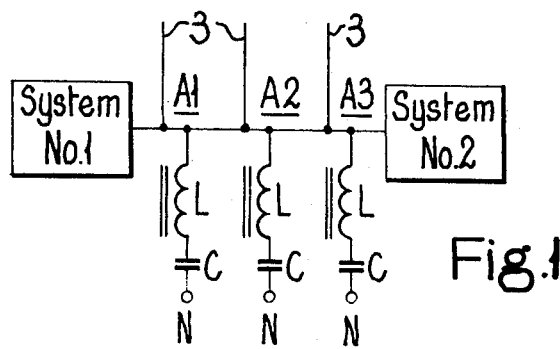
FIG. 1 is a simplified diagram of one phase of an A.C. power supply system incorporating voltage compensating saturable reactors.

Referring to FIG. 1 this shows two A.C. power systems and one phase of an interconnecting supply line. Three intermediate stations A1, A2 and A3 are shown, each of which feeds a local bus 3. Also at each station is a voltage compensating circuit comprising a saturable reactor L connected in series with a capacitor C between line and neutral. This is a known arrangement for limiting voltage swings on the line in the event, for example, of a sudden disconnection of the load system.

Figure 2:
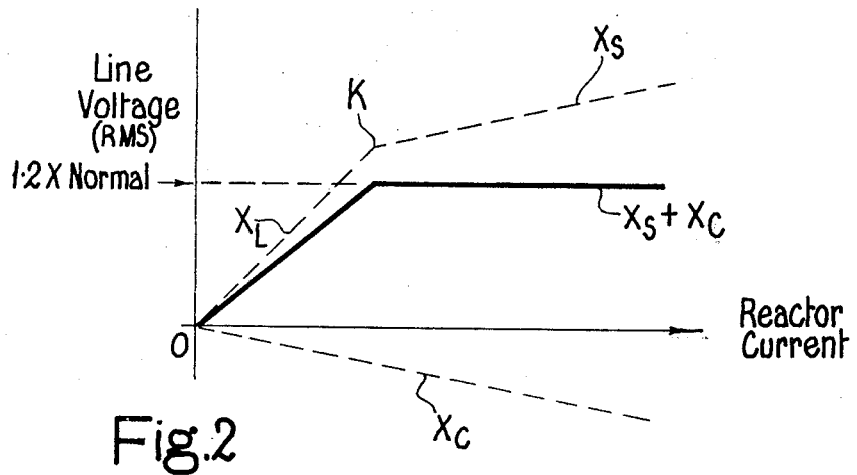
FIG. 2 is a current/voltage characteristic of a saturable reactor showing the effect of a series capacitor.

The saturable reactor L has an ideal characteristic as shown in FIG. 2, having an unsaturated portion up to the knee K and a subsequent saturated portion of lesser slope. The reactance of the unsaturated portion, $X_L$, is commonly nearly four times that, $X_S$, of the saturated portion. The reactor is arranged to operate just below the knee voltage so that, with a sharp rise in line voltage, the reactor saturates and a very large inductive current is drawn, substituting for the load current now removed. As a result of the low saturated reactance $X_S$, the voltage rise is relatively small. Meanwhile, the restored line current keeps the line voltage down to an acceptable level.

There is still, however, some increase in the reactor voltage over the saturated range and this is compensated by adding to the saturable reactor a constant negative reactance provided by the capacitor C in series with the reactor. The magnitude of this reactance, $X_C$, is chosen to be equal to that of the saturated reactance $X_S$ (or may, if desired, be chosen to be slightly greater or less in certain circumstances). The resulting characteristic is then the full line of FIG. 2 having an unsaturated reactance $X_L + X_C$, and a saturated reactance of $X_S + X_C$, although the dynamic reactance in the saturated region is zero.

In the A.C. power system shown by way of example in FIG. 1 it is the compensating capacitors C which are sometimes subject to self-excited parasitic oscillations, of harmonic or sub-harmonic frequency, or both. Series line capacitors and also capacitors in other than line transmission situations may also be subject to such oscillations.

In the subsequent Figures, the capacitors C may be considered for convenience to be the capacitor C of FIG. 1, although the circuits are not of course restricted to that application.

Figure 3:
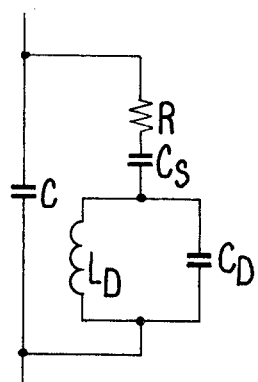
FIGS. 3–15 are examples of damping circuits such as may be applied to a capacitor of FIG. 1.
Figure 4:
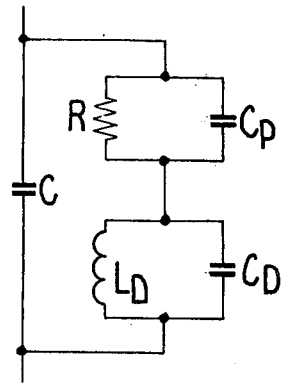

Referring to FIGS. 3 and 4, the capacitor C provides one of two parallel paths and a resistance path provides the other. This latter path includes a damping resistor R in which the parasitic oscillation is to be dissipated and a parallel resonant circuit comprising an inductor $L_D$ and a capacitor $C_D$. This resonant circuit is resonant at the operative frequency of the circuit, which, in the case of FIG. 1, is the supply frequency. It therefore presents a high impedance to the supply frequency current which is consequently biased toward the alternative path through the capacitor C.

The supply frequency current is not therefore dissipated in the resistor R, i.e. damped, to any significant extent. However, at sub-harmonic frequencies below the supply frequency, the resonant circuit $L_D/C_D$ will be inductive, so tending to bias parasitic currents toward the lossless path of capacitor C to some extent. The maximum damping effect will not therefore be obtained.

According to the invention however, the resulting inductance of the resonant circuit $L_D/C_D$ at a selected sub-harmonic frequency is balanced by a capacitor $C_S$ of appropriate value connected in series with the resistance R. This then provides a series resonance, what might be called a damping resonance, at the selected sub-harmonic frequency, at which maximum damping of the parasitic oscillation occurs. The sub-harmonic current is in effect biased toward the lossy path of the resistance R.

Instead of inserting a series capacitor $C_S$ as in FIG. 3, a capacitor $C_p$ may be connected in parallel with R as shown in FIG. 4. The value of the capacitor $C_p$ is again chosen to make the resistance path purely resistive at the selected sub-harmonic frequency.

The arrangement of FIG. 4 is preferable, for, at still lower frequencies the parallel reactance $C_p$ will tend to bias parasitic currents to pass through the resistance R rather than divert them from it, as in FIG. 3.

Figure 5:
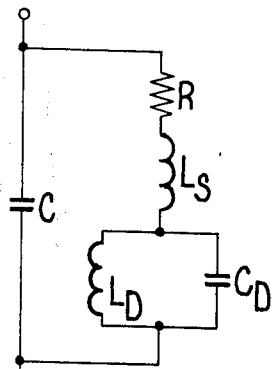
Figure 6:
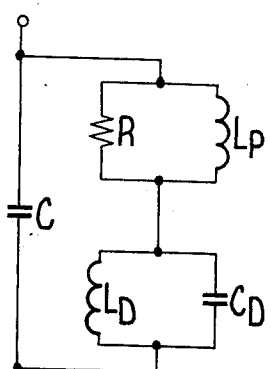

FIGS. 5 and 6 show similar arrangements to suppress parasitic oscillations of a selected harmonic frequency, i.e. higher than the supply frequency. In these arrangements, the resonant circuit $L_D/C_D$ is again resonant at the supply frequency to reject supply frequency current from the resistance path. It does therefore become capacitive at the higher parasitic frequency and an inductor is required, in series with the resulting capacitance to provide the damping resonance at which the resistance path is purely resistive.

The values of the series and parallel inductances $L_S$ and $L_p$ are chosen accordingly for the selected harmonic frequency.

The arrangement of FIG. 6 is again preferable in respect of higher frequency oscillations but the arrangement of FIG. 5 has the advantage that the resistance R and inductance $L_S$ can be combined in a single component, an inductive resistor.

The value of $L_S$ and $L_p$ in FIGS. 5 and 6, or $C_S$ and $C_p$ in FIGS. 3 and 4, can in fact be chosen so that the whole circuit shown, including the main capacitor C, becomes purely resistive at the harmonic frequency. A further improvement in the damping effectiveness is thus achieved.

Figure 7:
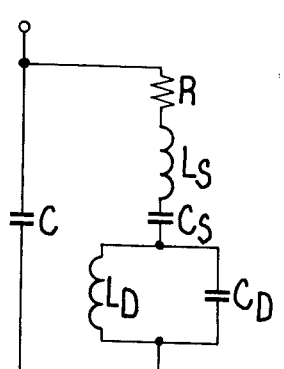
Figure 8:
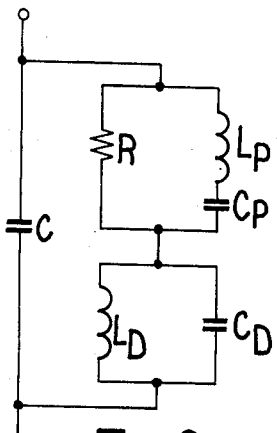

It may be desired to increase the damping selectively for both sub-harmonic and harmonic frequencies. FIGS. 7 and 8 illustrate damping circuits achieving this. In FIG. 7 the capacitor $C_S$ in series with the resultant inductive reactance of the shunt circuit $L_D/C_D$ produces a 'damping resonance' at a selected sub-harmonic frequency, while the series inductor $L_S$ produces a damping resonance at a selected harmonic frequency. The required values of $L_S$ and $C_S$ are not such as will balance each other at either frequency.

FIG. 8 shows an alternative arrangement to that of FIG. 7 for producing selective damping at both higher and lower frequencies than the supply frequency. In this case the components $L_p$ and $C_p$ are connected in parallel with the damping resistance R.

The series circuit $L_p/C_p$ may be designed, by compromising the individual values to a small extent if necessary, to provide a series resonance at the supply frequency. Any inaccuracy in the values of the rejection circuit $L_D/C_D$, resulting in a small amount of supply frequency current in the damping path, will then be compensated by the resonant bypass of the resistance R.

FIGS. 3–8, described above, employ shunt, or rejection, circuits $L_D/C_D$ to bias the supply frequency current away from the resistance path and toward the lossless path.

An alternative method of avoiding damping the supply frequency current is to use a series resonant acceptor circuit to bypass the whole of the resistance path at the supply frequency. Such an arrangement is illustrated in FIGS. 9–14.

In these Figures the main compensating capacitor C is connected in series with a series resonant circuit $L_C C_D$ resonant at the supply frequency. Supply frequency currents are therefore biased away from the alternative damping path, which is also in series with the capacitor C.

Figure 9:
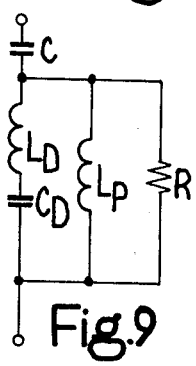

FIG. 9 illustrates an arrangement providing selective damping at a frequency lower than the supply frequency. At such a low frequency, the acceptor circuit $L_D/C_D$ has a resultant capacitive reactance which, in parallel with the inductor $L_p$, produces a parallel resonant circuit and a high impedance across the resistance R. Parasitic currents at the selected low frequency are therefore biased toward the resistance path and damping at that low frequency occurs.

Figures 10, 11:
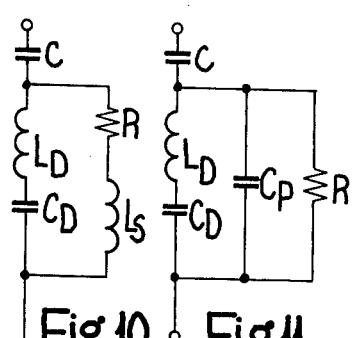

FIG. 10 shows a comparable arrangement in which the inductor $L_S$ is placed in series with the resistance R. In this case the circulating parasitic currents pass directly through the resistance R and damping again occurs.

The arrangement of FIG. 10 is advantageous in that the resistance R and inductance $L_S$ can again be incorporated in a single component.

Figure 12:
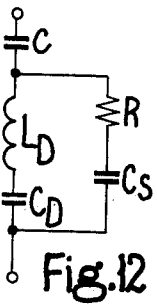

FIGS. 11 and 12 show arrangements corresponding to FIGS. 9 and 10 but for selective damping of parasitic frequencies higher than the supply frequency. In each case the resultant reactance of the acceptor circuit at the higher frequency is inductive and a capacitor $C_p$ or $C_S$ is inserted to balance it.

Figure 13:
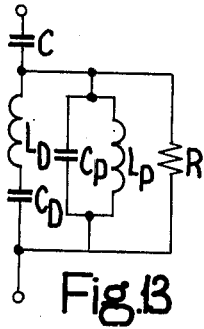
Figure 14:
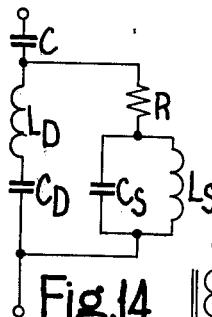

FIGS. 13 and 14 show arrangements combining the damping resonances of FIGS. 9 and 11 and FIGS. 10 and 12 respectively.

In comparable manner to that in FIG. 8, the parallel circuit $C_S/L_S$ in FIG. 14 may be made resonant at the supply frequency thus suppressing any remnant supply frequency current in the resistance path.

Figure 15:
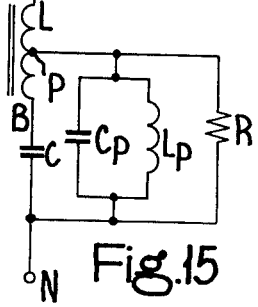

FIG. 15 shows a modification of the series resonant circuit of FIG. 13 for application to an A.C. supply system capacitor. In this modification the saturable reactor L (of FIG. 1) is tapped, at a point P such that the portion BP in series with the main capacitor C is resonant at the supply frequency. The resistance path is then connected between the point P and the neutral point N. Damping resonances are then provided as in any of FIGS. 9–14 according to the requirements. The arrangement of FIG. 13, with a capacitor and inductor in parallel with the resistance is shown as an example.

In this way the use of additional components for the basic supply frequency resonant circuit is obviated.

The main advantage of the circuits according to the invention is that with the same size components in the supply frequency resonant circuit greater damping of other frequency currents can be achieved, or alternatively, with comparable damping of the parasitic currents smaller components can be employed in the supply frequency resonant circuit.

I claim:

1. A frequency selective damping circuit for the suppression of parasitic resonances associated with a voltage compensating supply-frequency capacitor, said damping circuit comprising two parallel paths one of which is a damped path including resistance and one of which is an undamped path, and a resonant circuit tuned to said supply frequency and connected to bias current of the supply frequency toward said undamped path, said supply-frequency capacitor being connected in series with said undamped path, said damping circuit further comprising reactive circuit means which, in combination with said resonant circuit provides a further resonant circuit, at the resonant frequency of which, current is biased toward said damped path, the arrangement being such that current of the supply frequency is relatively undamped and current of a predetermined other frequency is selectively damped.

2. A damping circuit according to claim 2 wherein the first resonant circuit is a shunt circuit, said damping path comprising said shunt circuit in series with said resistance and the other, undamped, parallel path comprising said capacitor.

3. A damping circuit according to claim 2 wherein said reactive circuit means comprises an inductor connected in series with said resistance to provide a damping resonance at a frequency higher than the supply frequency.

4. A damping circuit according to claim 2 wherein said reactive circuit means and said resistance are together constituted by an inductive resistor to provide a damping resonance at a frequency higher than said supply frequency.

5. A damping circuit according to claim 2 wherein said reactive means comprises an inductor connected in parallel with said resistance to provide a damping resonance at a frequency higher than said supply frequency.

6. A damping circuit according to claim 2 wherein said reactive circuit means comprises a capacitor connected in series with said resistance to provide a damping resonance at a frequency lower than said supply frequency.

7. A damping circuit according to claim 2 wherein said reactive circuit means comprises a capacitor connected in parallel with said resistance to provide a damping resonance at a frequency lower than said supply frequency.

8. A damping circuit according to claim 1 wherein the first resonant circuit is a series resonant circuit, said damped parallel path comprising said resistance and the other, undamped, parallel path comprising said series resonant circuit, said capacitor being connected in series with each path.

9. A damping circuit according to claim 8 wherein said reactive circuit means comprises a capacitor connected in parallel with said resistance to provide a damping resonance at a frequency higher than said supply frequency.

10. A damping circuit according to claim 8 wherein said reactive circuit means comprises a capacitor connected in series with said resistance to provide a damping resonance at a frequency higher than said supply frequency.

11. A damping circuit according to claim 8 wherein said reactive circuit means comprises an inductor connected in parallel with said resistance to provide a damping resonance at a frequency lower than said supply frequency.

12. A damping circuit according to claim 8 wherein said reactive circuit means comprises an inductor connected in series with said resistance to provide a damping resonance at a frequency lower than said supply frequency.

13. In a voltage compensating circuit for an A.C. power system including a damping circuit according to claim 1, said supply frequency capacitor is connected in series with a saturable core reactor to the A.C. power supply line.

14. In a voltage compensating circuit according to claim 13, said saturable core reactor is tapped at a point such that the part of the reactor between the tapping point and said capacitor, and the capacitor itself, together provide a series resonant circuit resonant at the supply frequency and constituting the first resonant circuit of said damping circuit.

15. A frequency selective damping circuit for the suppression of parasitic resonances associated with a voltage compensating supply-frequency capacitor, said damping circuit comprising two parallel paths one of which is a damped path including resistance and one of which is an undamped path, and a resonant circuit turned to said supply frequency and connected to bias current of the supply frequency toward said undamped path, said supply-frequency capacitor being connected in series with said undamped path, said damping circuit further comprising reactive circuit means, including reactances of opposite kinds, which, in combination with said resonant circuit provides two further resonant circuits, having resonant frequencies above and below said supply frequency respectively at which said resonant frequencies, current is biased toward said damped path, the arrangement being such that current of the supply frequency is relatively undamped and current of two predetermined other frequencies is selectively damped.

16. A damping circuit according to claim 15 wherein the first resonant circuit is a shunt circuit, said damping path comprising said shunt circuit in series with said resistance and the other, undamped, parallel path comprising said capacitor.

17. A damping circuit according to claim 11 wherein said reactive circuit means comprises an inductor and capacitor connected in series with each other and with said resistance to provide damping resonances at frequencies higher and lower than said supply frequency.

18. A damping circuit according to claim 16 wherein said reactive circuit means comprises an inductor and capacitor connected in series with each other and in parallel with said resistance to provide damping resonances at frequencies higher and lower than said supply frequency.

19. A damping circuit according to claim 15 wherein the first resonant circuit is a series resonant circuit, said damped parallel path comprising said resistance, and the other, undamped, parallel path comprising said series resonant circuit, said capacitor being connected in series with each path.

20. A damping circuit according to claim 19 wherein said reactive circuit means comprises an inductor and a capacitor connected in parallel with each other and with said resistance to provide damping resonances at frequencies lower and higher than said supply frequency.

21. A damping circuit according to claim 19 wherein said reactive circuit means comprises an inductor and a capacitor connected in parallel with each other and in series with said resistance to provide damping resonances at frequencies lower and higher than said supply frequency.

* * * * *